United States Patent [19]

Fukuda

[11] Patent Number: 5,772,277
[45] Date of Patent: Jun. 30, 1998

[54] FRONT PORTION OF VEHICLE BODY STRUCTURE FOR AUTOMOBILE

[75] Inventor: Makoto Fukuda, Wako, Japan

[73] Assignee: Honda, Giken Kogyo Kabushiki Kaisha, Tokyo, Japan

[21] Appl. No.: 747,992

[22] Filed: Nov. 12, 1996

Related U.S. Application Data

[63] Continuation of Ser. No. 526,248, Sep. 11, 1995, abandoned.

[30] Foreign Application Priority Data

Sep. 12, 1994 [JP] Japan ................................ 6-217113

[51] Int. Cl.[6] ........................................................ B60J 7/00
[52] U.S. Cl. .................................... 296/201; 296/146.15
[58] Field of Search .................................... 296/201, 203, 296/205, 146.15, 96.12, 96.21, 194

[56] References Cited

U.S. PATENT DOCUMENTS

| 1,143,635 | 6/1915 | Ledwinka ................................ 296/203 |
| 1,523,636 | 1/1925 | Dunn ........................................ 296/203 |
| 1,534,814 | 4/1925 | Seelinger ................................ 296/201 |
| 1,545,727 | 7/1925 | Barndt . |
| 2,269,451 | 1/1942 | Ford ........................................ 296/205 |
| 2,389,907 | 11/1945 | Helmuth .................................. 296/203 |
| 2,437,664 | 3/1948 | Hicks ........................................ 296/84 |
| 2,719,749 | 10/1955 | Richards et al. ........................... 296/28 |
| 3,121,924 | 2/1964 | Beisel ........................................ 20/56 |
| 3,155,420 | 11/1964 | Belsky ...................................... 296/44 |
| 3,198,572 | 8/1965 | Stolarczyk ................................ 296/28 |
| 4,043,586 | 8/1977 | Hafer ........................................ 296/84 |
| 4,807,925 | 2/1989 | Sakamoto et al. ...................... 296/203 |
| 5,042,872 | 8/1991 | Yoshii . |
| 5,139,307 | 8/1992 | Koops et al. ............................ 296/201 |

FOREIGN PATENT DOCUMENTS

3925170 C2  7/1989  Germany .

OTHER PUBLICATIONS

Patent Abstracts of Japan, "Body Structure of Automobile" M–1219, Mar. 9, 1992, vol. 16/No. 94.

*Primary Examiner*—Stephen Avila
*Attorney, Agent, or Firm*—Nikaido, Marmelstein, Murray & Oram LLP

[57] ABSTRACT

A front portion of a vehicle body structure including a front pillar having a front pillar inner upper member, a front pillar inner lower member, a cowl connection bracket, a front pillar stiffener and a front pillar outer upper member. A front side windshield is mounted to a triangular windshield support frame which is integrally formed to the front pillar inner upper member. The front pillar inner upper member is reinforced by the windshield support frame. As a result, the rigidity of the front pillar is enhanced.

4 Claims, 7 Drawing Sheets

FRONT PORTION OF VEHICLE BODY STRUCTURE FOR AUTOMOBILE

This application is a continuation of application Ser. No. 08/526.248 filed Sep. 11, 1995, now abandoned.

BACKGROUND OF THE INVENTION

1. Field of the Invention

The present invention relates to a front portion of a vehicle body structure for an automobile in which a fixed front side windshield is disposed between a front pillar and a side door window.

2. Description of the Prior Art

In a prior art front portion of a vehicle body structure for an automobile, in order to separate a triangular window, provided at a front portion of a front door, from the front door and dispose the window along a rear edge of a front pillar as a fixed front side windshield, the fixed front side windshield is secured by welding a support frame of the front side windshield along the rear edge of the front pillar.

However, the support frame, which is welded to the rear edge of the front pillar, is prone to come out from the front pillar when a shock is applied to the support frame, and this support frame can not satisfactorily function as a reinforcing member which enhances the rigidity of the front pillar. Therefore, in order to provide the front pillar with a sufficient rigidity, it is necessary to increase a thickness of the members of the front pillar. However, this will also increase a weight of the front pillar which is not preferable.

SUMMARY OF THE INVENTION

The present invention has been accomplished in view of the above-described circumstances, and it is an object of the present invention to enhance the rigidity of the front pillar without increasing a weight thereof, by utilizing the support frame of the front side windshield.

To achieve the above object, according to the present invention, there is provided a front portion of a vehicle body structure for an automobile including a fixed front side windshield between a front pillar and a side door window, wherein the support frame of the front side windshield is integrally formed to the front pillar.

According to above-described arrangement, it is possible to reinforce the front pillar by the support frame to enhance a rigidity of the front pillar. Therefore, it is unnecessary to increase a weight of the front pillar itself for reinforcing the same, which makes it possible to reduce the weight of the vehicle body as a whole.

The above and other objects, features and advantages of the invention will become apparent from the following description of a preferred embodiment, taken in conjunction with the accompanying drawings.

DESCRIPTION OF THE PREFERRED EMBODIMENT

Figure 1:
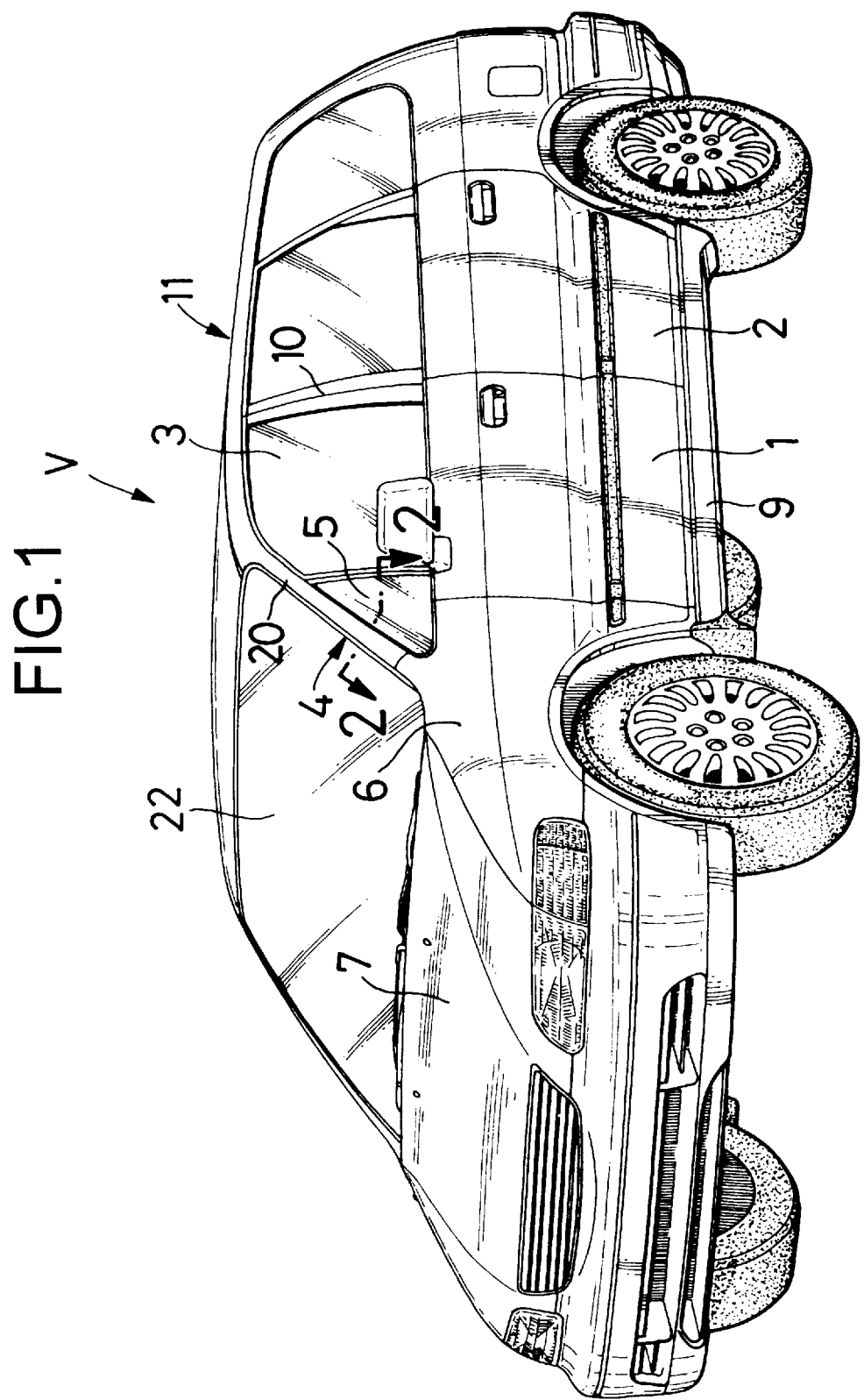
FIG. 1 is a perspective view of an entire automobile.

FIG. 1 shows a five door automobile V. The automobile V includes right and left front doors 1, 1, right and left rear doors 2, 2 and a back door (not shown).

The automobile V also includes right and left triangular windows or front side windshields 5 which are positioned between right and left front pillars 4 and right and left front door windows 3 mounted on upper portions of the front doors 1, 1, respectively. The front side windshield 5 and the front pillar 4 are separate members, and the front side windshield 5 is secured to the front pillar 4.

Figure 3:
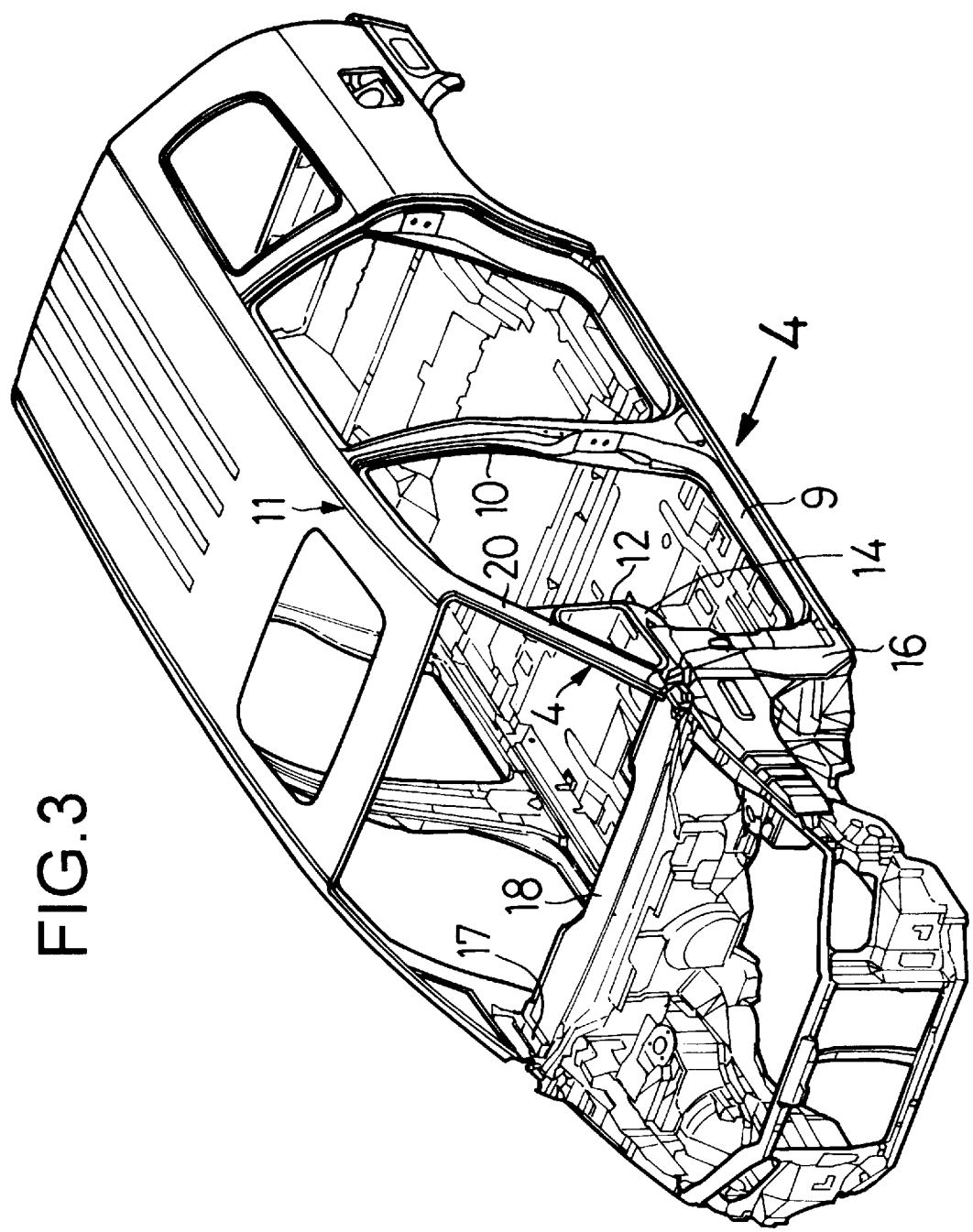
FIG. 3 is a perspective view of a vehicle body.

FIG. 3 shows a vehicle body of the automobile V from which right and left front side fenders 6, 6 (see FIG. 1) and a bonnet or hood 7 (see FIG. 1) are removed.

The vehicle body of the automobile V is basically symmetrical about the longitudinal axis. Therefore, description will basically be made with respect to only one side of the vehicle body for convenience sake hereinafter.

Figure 4:
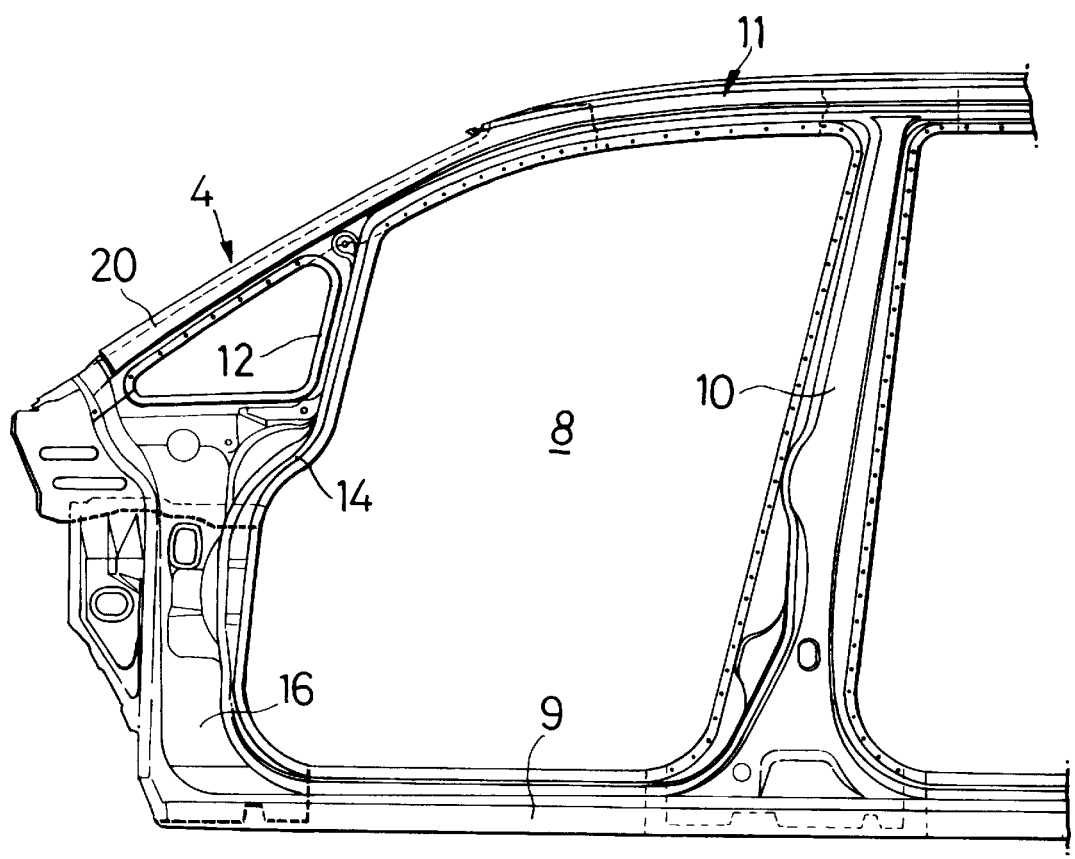
FIG. 4 is a view taken in the direction of an arrow 4 in FIG. 3.

As is clear from FIGS. 3 and 4, an opening 8 for the front door 1 is formed by the front pillar 4, a side sill 9, a center pillar 10 and a roof side rail 11. A triangular windshield support frame 12, which supports the front side windshield 5, is integrally formed to the front pillar 4.

Figure 5:
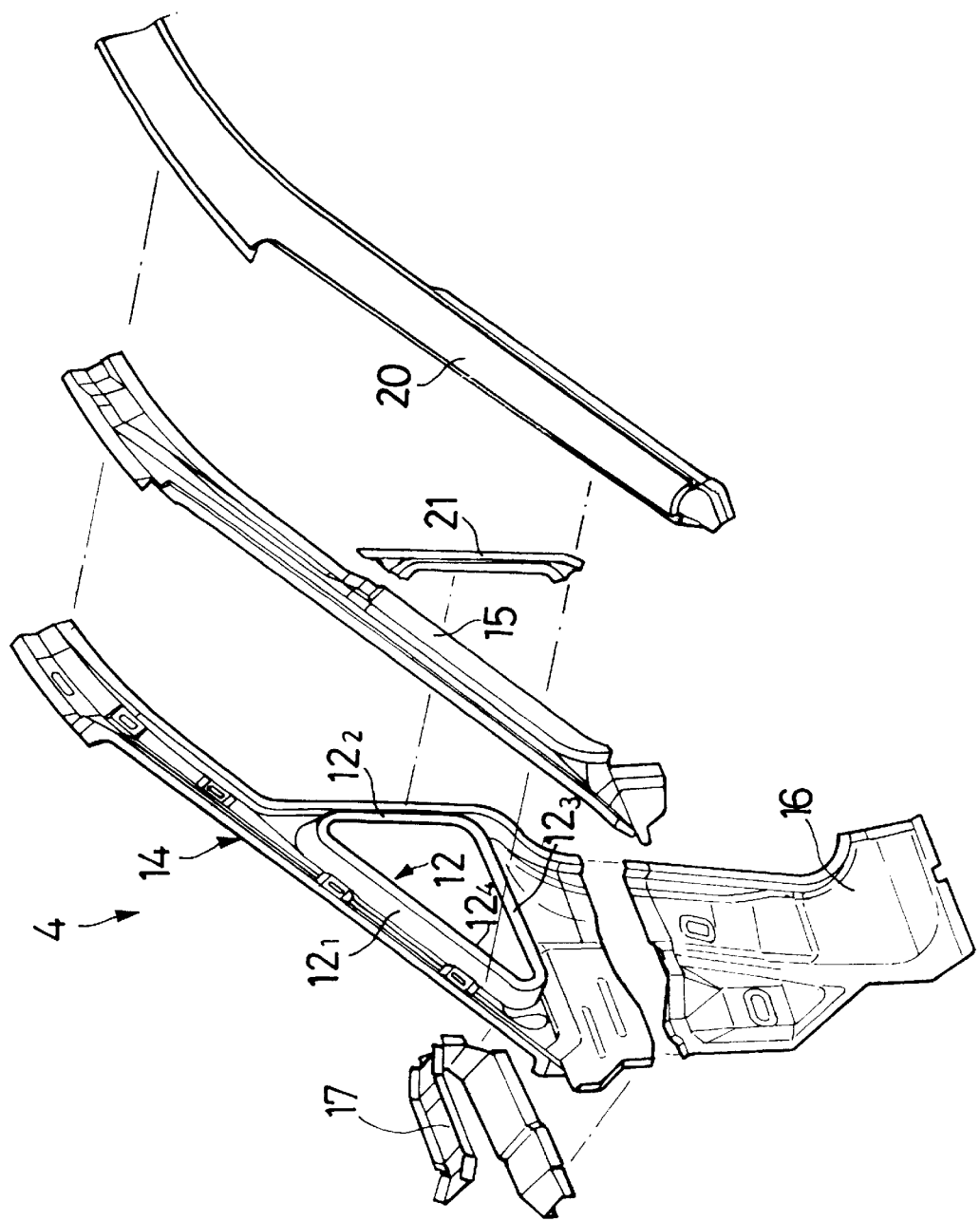
FIG. 5 is an exploded perspective view of a front pillar.
Figure 6:
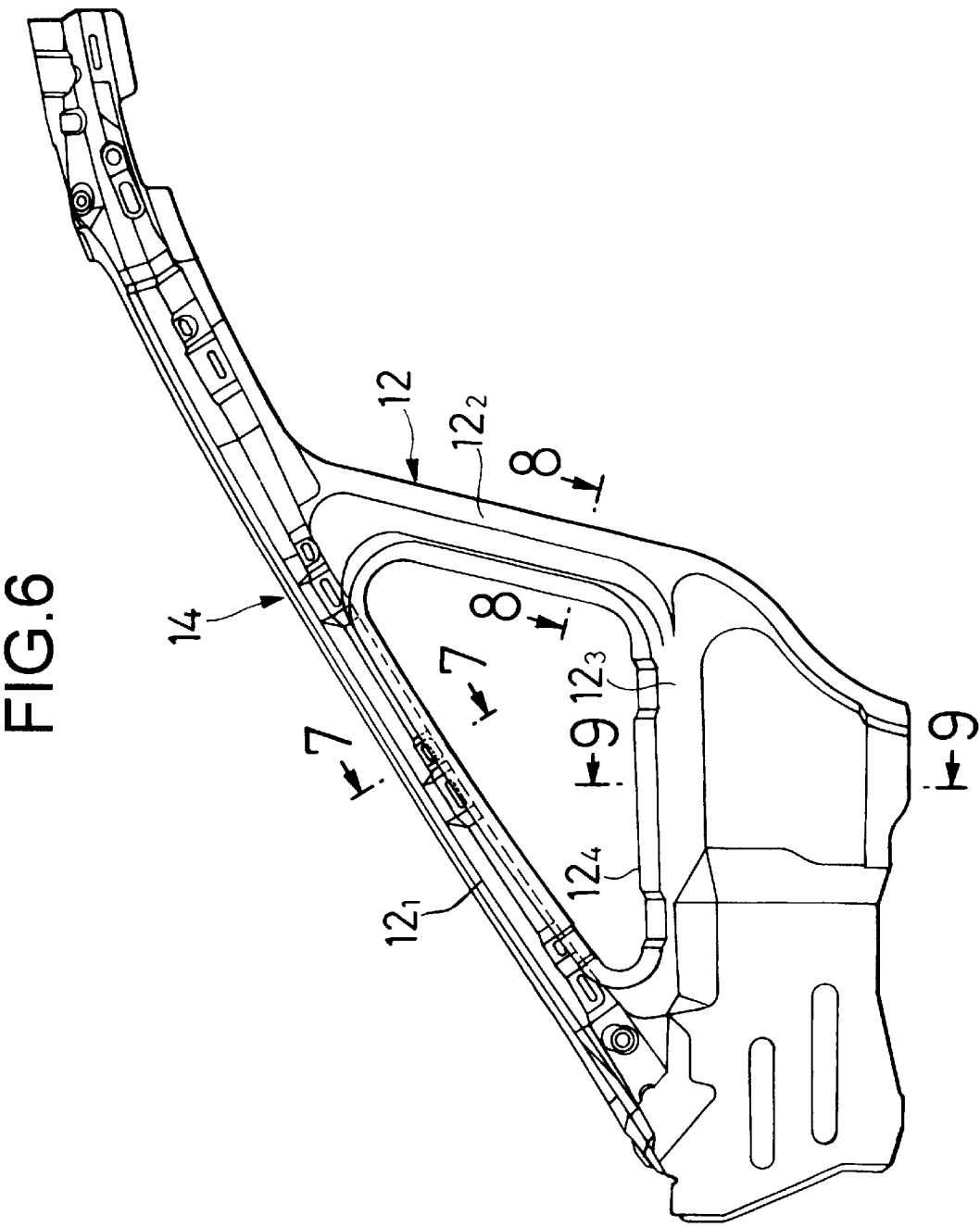
FIG. 6 is a side view of a front pillar inner upper.
Figure 7:
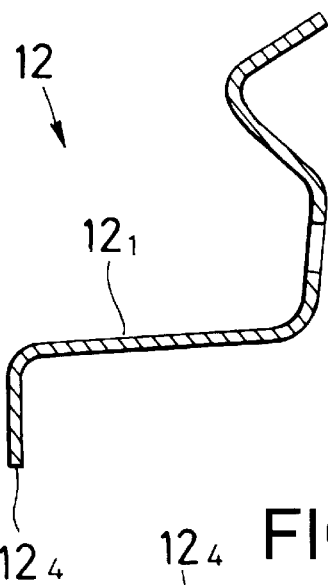
FIG. 7 is a sectional view taken along a line 7—7 in FIG. 6.
Figure 8:
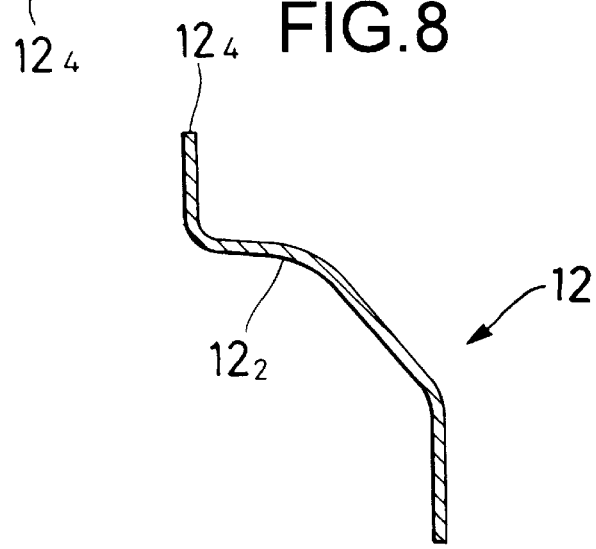
FIG. 8 is a sectional view taken along a line 8—8 in FIG. 6.
Figure 9:
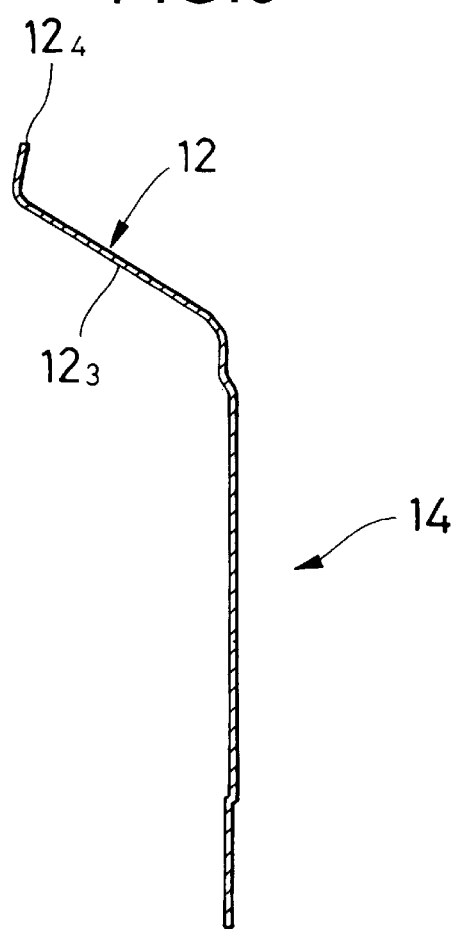
FIG. 9 is a sectional view taken along a line 9—9 in FIG. 6.

FIG. 5 is an exploded perspective view of the front pillar 4. The front pillar 4 includes a front pillar inner upper member 14 which is integrally provided with the triangular windshield support frame 12 which supports the front side windshield 5; a front pillar stiffener 15 which is welded to an outside of the front pillar inner upper member 14; a front pillar inner lower member 16 which is welded to a lower portion of the front pillar inner upper member 14; and a cowl connection bracket 17 which is welded to an inner surface of the front pillar inner lower member 16. The right and left cowl connection brackets 17, 17 are respectively welded to opposite ends of a cowl 18 (see FIG. 3) which extends in a lateral direction of the vehicle body. As described above, the front pillar 4 includes the front pillar inner upper member 14, the front pillar stiffener 15, the front pillar inner lower member 16 and the cowl connection bracket 17. In addition to these members, the front pillar 4 also includes a front pillar outer upper member 20 and a front pillar outer intermediate member 21. The front pillar outer upper member 20 is integrally formed to a front portion of an outer member of the roof side rail 11, and is welded to an outer surface of the front pillar stiffener 15. The front pillar outer intermediate member 21 is welded to an outer surface of the rear frame portion $12_2$ of the windshield support frame 12 which will be described below.

As shown in FIGS. 6 to 9, the windshield support frame 12 which is integral with the front pillar inner upper member 14, is formed into a triangular shape by a front frame portion $12_1$, a rear frame portion $12_2$ and a lower frame portion $12_3$. The triangular windshield support frame 12 is provided at its inner periphery with an opening $12_4$ in which the front side windshield 5 is mounted.

Figure 2:
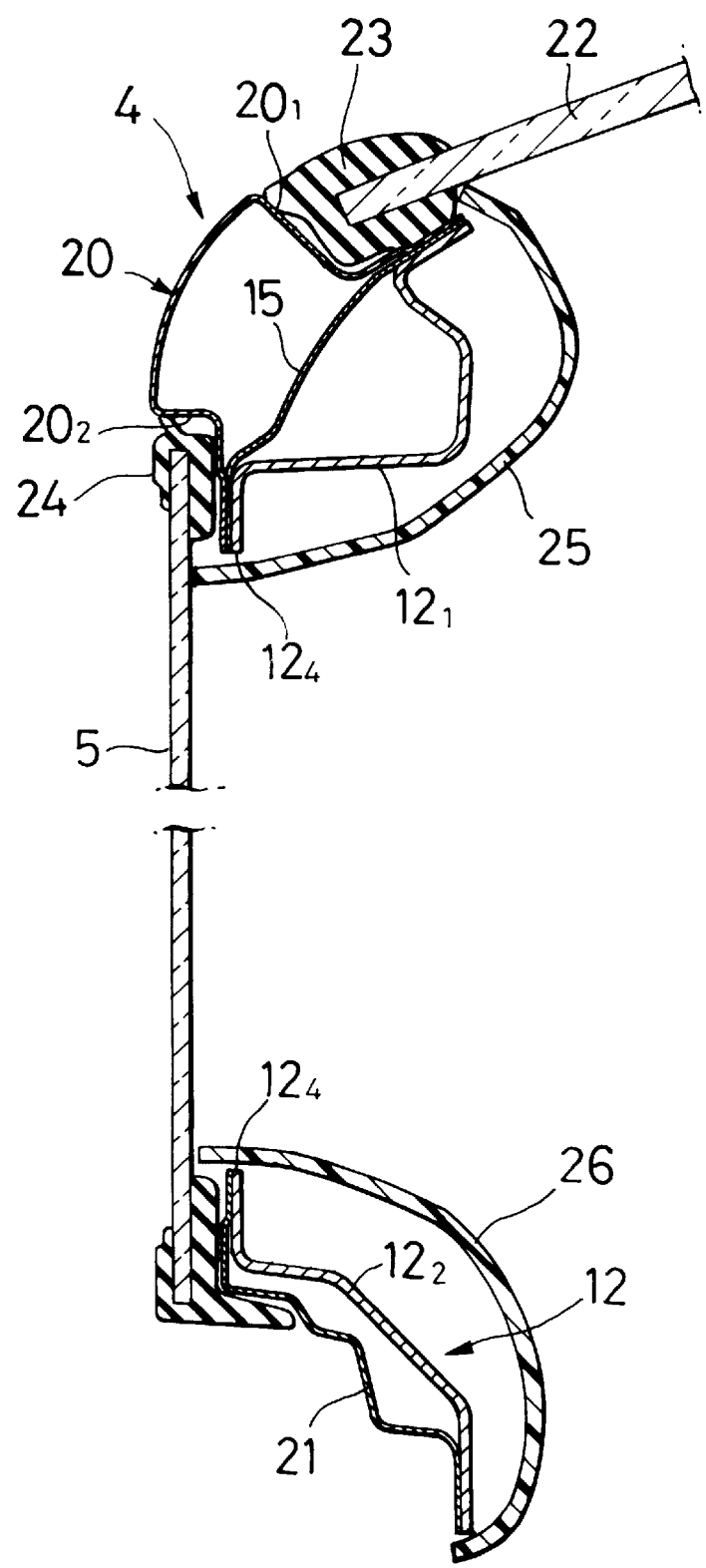
FIG. 2 is an enlarged sectional view taken along a line 2—2 in FIG. 1.

As is clear from FIG. 2, the front pillar stiffener 15 is welded to an outer surface of the front frame portion $12_1$ of the windshield support frame 12 which is integral with the front pillar inner upper member 14. Moreover, the front pillar outer upper member 20 is welded to an outer surface of the front pillar stiffener 15. Further, the front pillar outer intermediate member 21 is welded to an outer surface of the rear frame portion $12_2$ of the windshield support frame 12.

A front windshield 22 is held at its side edge by a weatherstrip 23 in a recess $20_1$ formed in the front pillar outer upper member 20. The front side windshield 5 is held in a weatherstrip 24 in a recess $20_2$ formed in the front pillar outer upper member 20 and in an outer surface of the front pillar outer intermediate member 21. Portions of the windshield support frame 12 which face a passenger compartment are covered with linings 25, 26 so that the windshield support frame 12 is not visually exposed to a passenger in the passenger compartment.

Since the front pillar 4 and the windshield support frame 12 for supporting the front side windshield 5 are integrally formed, it is possible to effectively reinforce the front pillar 4 by means of the windshield support frame 12 to enhance the rigidity of the vehicle body. As a result, it is unnecessary to increase a thickness of each of the components forming the front pillar 4. This contributes to a reduction of a vehicle weight.

In the described embodiment, three members, i.e., the front pillar inner upper member, the front pillar stiffener and the front pillar outer upper member form the front pillar, and among these three members, the front pillar inner upper member is integrally formed to the windshield support frame of the front side windshield. Alternatively, any one or a plurality of the three members may integrally be formed to the windshield support frame.

Although the embodiment of the present invention has been described in detail, it will be understood that the present invention is not limited to the above-described embodiment, and various modifications in design may be made without departing from the scope of the invention.

I claim:

1. A front portion of a vehicle body structure comprising:
   a front pillar including an inner upper member and a triangular windshield support frame means which are formed from a single piece of material, said triangular windshield support frame means having a triangular opening formed therein, said inner upper member having a predetermined width and said triangular windshield support frame means having a width which is wider than the predetermined width of said inner upper member;
   a side door window; and
   a front side windshield positioned between said front pillar and said side door window;
   wherein said triangular windshield support frame means supports said front side windshield in said triangular opening.

2. A front portion of a vehicle body structure as set forth in claim 1, wherein said triangular windshield support frame means comprises a front frame portion extended from said inner upper member, a rear frame portion extended from said front pillar, and a lower frame portion extending between said front frame portion and said rear frame portion.

3. A front portion of a vehicle body structure as set forth in claim 2, wherein said front pillar further comprises an inner lower member, a pillar stiffener, an outer upper member and an outer intermediate member, and wherein said rear frame portion of said triangular windshield support frame means is fixed to said outer intermediate member, and said lower frame portion of said triangular windshield support frame means is fixed to said inner lower member.

4. A front portion of a vehicle body structure comprising:
   a front pillar having an integral portion formed from a single piece of material, said integral portion having first and second ends and an intermediate portion therebetween, said integral portion including an inner upper member formed at said first end and a frame means, defining a substantially triangular opening therein, formed at said intermediate portion;
   a side door window; and
   a front side windshield positioned between said front pillar and said side door window;
   wherein said frame means of the front pillar for supporting said front side windshield in said substantially triangular opening.

* * * * *